United States Patent [19]

Vinansky, Jr. et al.

[11] 4,031,301

[45] June 21, 1977

[54] MICRO PARTICLE GENERATION

[75] Inventors: George Vinansky, Jr., Dover; Emmanuel A. Lucia, Marlton, both of N.J.

[73] Assignee: The United States of America as represented by the Secretary of the Army, Washington, D.C.

[22] Filed: Sept. 10, 1975

[21] Appl. No.: 612,052

[52] U.S. Cl. .............................. 526/328; 264/12; 264/14
[51] Int. Cl.² .......................................... B01J 2/04
[58] Field of Search ................. 264/11, 13, 14, 12; 526/328

[56] References Cited

UNITED STATES PATENTS

| | | | |
|---|---|---|---|
| 3,056,728 | 10/1962 | Ohtaki | 424/34 |
| 3,446,877 | 5/1969 | Endler | 264/13 |
| 3,561,003 | 2/1971 | Lanham | 264/13 |
| 3,739,049 | 6/1973 | Honjo | 264/13 |
| 3,803,111 | 4/1974 | Munro | 526/328 |

*Primary Examiner*—Robert F. White
*Assistant Examiner*—James R. Hall
*Attorney, Agent, or Firm*—Nathan Edelberg; Robert P. Gibson; Kalman Pollen

[57] ABSTRACT

Scavenger aerosol sprayed into first aerosol containing solute dissolved in solvent picks up solvent leaving behind solute as micro particles. Scavenger aerosol consists of a liquid which sequesters the solvent of the first aerosol from its solute by exhibiting a greater chemical affinity for the solvent than for the solute therein.

8 Claims, No Drawings

MICRO PARTICLE GENERATION

The invention described herein may be manufactured, used and licensed by or for the Government for governmental purposes without the payment to us of any royalty thereon.

This invention relates to micro particle generation and more particularly concerns micro particles formed from aerosols.

Military as well as commercial applications require product of micro particles 3-100 microns in diameter. These particles may be incorporated into plastic matrixes to form safety shields, or in a well known commercial application, micro particles of pigments may be added into suitable liquids to form paints.

Despite rather extensive use of micro particles, past methods for forming these particles are either extremely expensive or unsatisfactory. The most commonly used of such previous methods is grinding which suffers several disadvantages. Grinding generates heat which tends to fuze the ground materials thus tending to nullify the effect of the grinding. Furthermore, the generated heat must be continually dissipated. More troublesome than the heat produced, however, grinding tends to degrade chemically the material that is ground, frequently undesirably altering its properties. Additionally, the necessity of prolonged grinding to attain the desired particle size render such grinding applications generally unattractive.

An advantage of the present invention relates in the fact that micro particles may be formed instantly and continuously without the adverse consequences of chemical degradation thereof or of substantial heat formation. The micro particles of the present invention are produced when a scavenger aerosol is sprayed into a first aerosol containing solute dissolved in solvent, the scavenger aerosol picking up the solvent because of its great affinity therefor, and leaving behind the solute as micro particles.

In prior art thin film formation to be distinguished from the instant micro particle generation, polyvinyl acetate is dissolved in ethylene dichloride, the resulting solution then sprayed over water, the water and the ethylene dichloride then forming separate layers. The ethylene dichloride soon evaporates leaving behind the polyvinyl acetate polymer in the form of a fine film on the surface of the water. The present invention involves chemical affinity of a solvent for a second solvent rather than evaporation.

In prior art flocculation, latex polymer is dissolved in water, the water then being allowed to evaporate causing the dissolved polymer particles to come closer together. Then interparticle electrostatic forces draw these latex particles to one another to form particles of increasing size, the rapidly growing particles eventually dropping out of solution by virtue of their increased weight. Flocculation, however, does not involve affinity of solvents for each other and is basically an electrostatic phenomenon.

It is an object of the present invention to form chemically undegraded micro particles.

A further object of the invention is to form such chemically undegraded micro particles instantly and conveniently without adverse heat formation.

Yet another object of the invention is to form micro particles instantly and conveniently while at the same time controlling particles size of the newly-formed micro particles.

A still further object of the invention is to control particle size of the micro particles while at the same time forming such micro particles. inexpensively by a continuous process.

Briefly we have discovered that micro particles may be advantageously generated from aerosols. More particularly we have discovered that if a scavenger aerosol is sprayed into a first aerosol containing a solute dissolved in solvent, the scavenger aerosol will pick up the solvent leaving behind the solute in the form of micro particles.

In the practice of this invention the solute may be any one of a multitude of chemical substances and is suitably any substance that will dissolve in a solution without reacting either therewith or with the scavenger aerosol, a necessary part of the chemical system. Examples of suitable solute include dyes such as phthalocyanine dyes dissolved in chloronaphthalene and sprayed into benzene; polymers such as either polystyrene or methylmethacrylate dissolved in acetone or ethyl alcohol and sprayed into water. It should be borne in mind that our chemical system requires a scavenger aerosol. A scavenger aerosol may for the purposes of this invention be defined as an aerosol which sequesters a solvent from a solute dissolved therein because of the substantially greater chemical affinity of the scavenger aerosol for the solvent than for the dissolved solute. In the applications described herein the scavenger aerosol will be a liquid. The size of the micro particle may be diminished by either diluting the solution containing the solute or by decreasing the droplet size of the aerosol which contains the solute. By practicing our invention micro particles of about 3–100 microns may be controllably formed, the diameter of the particle being approximately constant for any given concentration of solute in solvent and droplet size of aerosol formed from the solvent.

The invention may be better understood by reference to the following illustrative example.

EXAMPLE I 500 mg plexiglass (polymethylmethacrylate) in the form of ⅛ inch pellets is introduced into 300 ml of acetone in a 1000 ml beaker. The beaker is placed on a hot plate set at 50° F, the solution being continually stirred by a magnetic stirrer until the plexiglass is completely dissolved, additional acetone being added as necessary to maintain the 300 ml volume of the solution now syrupy in texture. Then, the hot plate is turned off and with the magnetic stirrer left on, an additional 300 ml of acetone is added to the solution causing a clearing thereof and a disappearance therein of any darkening produced by refraction of light. The thus diluted solution may next be poured into an empty dispensing bottle, the bottle then being capped with an aerosol nozzle with attached intake tube descending into the bottle. An identical dispensing apparatus filled with water is also made ready. The liquids in each bottle are next sprayed into each other at such an angle, preferably 90°, so as to avoid coating of the nozzles, a plastic mat beneath the intersecting sprays catching the resulting micro particles formed therefrom. Some of the aerosol droplets, being less dense than the polymethylmethacrylate micro particles, fly beyond the plastic mat, other aerosol droplets falling onto the mat. Any liquid that accumulates on the mat is decanted leaving a conglomeration of micro particles of polymethylmethacrylate on the mat.

It is apparent that we have provided a simple and highly effective process for forming micro particles.

We wish it to be understood that we do not desire to be limited to the exact details herein described, for obvious modifications will occur to a person skilled in the art.

We claim:

1. Process for generating micro particles comprising spraying one aerosal into another, the first aerosol containing solute dissolved in solvent conpletely, the second aerosol being a scavenger aerosol, said scavenger aerosol being a liquid exhibiting a greater chemical affinity for said solvent of said first aerosol than for said solute, said scavenger aerosol removing said solvent from said first aerosol thereby leaving behind said solute of said first aerosol as micro particles.

2. Process according to claim 1 wherein said solute comprises a dye.

3. Process according to claim 1 wherein said dye comprises a phthalocyanine dye.

4. Process according to claim 1 wherein said solute comprises a polymer.

5. Process according to claim 4 wherein said polymer comprises polymethylmethacrylate.

6. Process according to claim 1 wherein said solvent of said first aerosol comprises acetone and said scavenger aerosol comprises water.

7. Process according to claim 1 wherein said solvent of said first aerosol comprises ethyl alcohol and said scavenger aerosol comprises water.

8. A conglomeration of micro particles formed by the process of claim 1.

* * * * *